US010999383B2

(12) United States Patent
Dozier et al.

(10) Patent No.: US 10,999,383 B2
(45) Date of Patent: *May 4, 2021

(54) SYSTEM FOR SYNCHRONIZING NODES ON A NETWORK

(71) Applicant: Cricket Media, Inc., McLean, VA (US)

(72) Inventors: Linda T. Dozier, Great Falls, VA (US); Edmund Fish, Great Falls, VA (US); Miles Gilburne, Washington, DC (US); Nina Zolt, Washington, DC (US)

(73) Assignee: Cricket Media, Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,139

(22) Filed: Sep. 5, 2017

(65) Prior Publication Data

US 2017/0366633 A1 Dec. 21, 2017

Related U.S. Application Data

(60) Continuation of application No. 15/360,744, filed on Nov. 23, 2016, now abandoned, which is a
(Continued)

(51) Int. Cl.
*H04L 29/08* (2006.01)
*G06F 16/90* (2019.01)
(Continued)

(52) U.S. Cl.
CPC ............. *H04L 67/22* (2013.01); *G06F 16/90* (2019.01); *G06Q 10/06* (2013.01); *G06Q 30/02* (2013.01);
(Continued)

(58) Field of Classification Search
None
See application file for complete search history.

(56) References Cited

U.S. PATENT DOCUMENTS

| 4,740,912 A | 4/1988 | Whitaker |
| 5,710,884 A | 1/1998 | Dedrick |

(Continued)

FOREIGN PATENT DOCUMENTS

| EP | 1338966 A2 | 8/2003 |
| FR | 2814844 A1 | 4/2002 |

(Continued)

OTHER PUBLICATIONS

U.S. Appl. No. 11/937,499, entitled "Method and System for Developing Process, Project or Problem-Based Learning Systems with a Semantic Collaborative Social Network," filed Nov. 8, 2007.

(Continued)

*Primary Examiner* — Dhairya A Patel
(74) *Attorney, Agent, or Firm* — Nelson Mullins Riley & Scarborough LLP

(57) ABSTRACT

A system of computers on a wide area network establishes connections between nodes on the basis of their multidimensional similarity at a particular point in time in a certain setting, such as a social learning network, and sends information of value to those nodes. Dimensions in the definition of similarity include a plurality of attributes in time and community space. Examples of such dimensions and attributes may include a position in a learning community's project cycle, titles of readings and projects, the genre or subject matter under consideration, age, grade, or level of the participants, and language. The network's nodes are represented as a tensor field and are searched efficiently and adaptively through a variety of multidimensional data structures and mechanisms. The system includes a master clock that can transform a participant's time coordinates on the network, such as a social learning network, into Universal Time, and the synchronizer coordinates the position of each participant.

6 Claims, 1 Drawing Sheet

Related U.S. Application Data continuation of application No. 14/050,418, filed on Oct. 10, 2013, now abandoned, which is a division of application No. 11/937,495, filed on Nov. 8, 2007, now Pat. No. 10,547,698.

(60) Provisional application No. 60/857,570, filed on Nov. 8, 2006.

(51) Int. Cl.
| | |
|---|---|
| *G09B 19/22* | (2006.01) |
| *G06Q 30/02* | (2012.01) |
| *G06Q 30/08* | (2012.01) |
| *G06Q 10/06* | (2012.01) |
| *G06Q 50/00* | (2012.01) |
| *H04L 29/06* | (2006.01) |
| *H04L 12/24* | (2006.01) |

(52) U.S. Cl.
CPC ............ *G06Q 30/08* (2013.01); *G06Q 50/01* (2013.01); *G09B 19/22* (2013.01); *H04L 41/0893* (2013.01); *H04L 65/403* (2013.01)

(56) References Cited

U.S. PATENT DOCUMENTS

| | | | |
|---|---|---|---|
| 5,740,549 | A | 4/1998 | Reilly et al. |
| 5,761,662 | A | 6/1998 | Dasan |
| 5,768,528 | A | 6/1998 | Stumm |
| 5,772,446 | A | 6/1998 | Rosen |
| 5,813,863 | A | 9/1998 | Sloane et al. |
| 5,907,831 | A | 5/1999 | Lotvin et al. |
| 5,933,498 | A | 8/1999 | Schneck et al. |
| 5,970,231 | A | 10/1999 | Crandall |
| 5,972,875 | A | 10/1999 | Crutcher et al. |
| 5,974,446 | A | 10/1999 | Sonnenreich et al. |
| 5,987,606 | A | 11/1999 | Cirasole et al. |
| 6,020,884 | A | 2/2000 | MacNaughton et al. |
| 6,029,195 | A | 2/2000 | Herz |
| 6,075,968 | A | 6/2000 | Morris et al. |
| 6,085,229 | A | 7/2000 | Newman et al. |
| 6,105,027 | A | 8/2000 | Schneider et al. |
| 6,157,924 | A | 12/2000 | Austin |
| 6,178,407 | B1 | 1/2001 | Lotvin et al. |
| 6,208,995 | B1 | 3/2001 | Himmel et al. |
| 6,233,618 | B1 | 5/2001 | Shannon |
| 6,249,282 | B1 | 6/2001 | Sutcliffe et al. |
| 6,279,013 | B1 | 8/2001 | LaMarca et al. |
| 6,296,487 | B1 | 10/2001 | Lotecka |
| 6,302,698 | B1 | 10/2001 | Ziv-El |
| 6,324,538 | B1 | 11/2001 | Wesinger, Jr. et al. |
| 6,341,960 | B1 | 1/2002 | Frasson et al. |
| 6,363,062 | B1 | 3/2002 | Aaronson et al. |
| 6,370,355 | B1 | 4/2002 | Ceretta et al. |
| 6,374,237 | B1 | 4/2002 | Reese |
| 6,381,444 | B1 | 4/2002 | Aggarwal et al. |
| 6,401,075 | B1 | 6/2002 | Mason et al. |
| 6,438,632 | B1 | 8/2002 | Kikugawa |
| 6,460,036 | B1* | 10/2002 | Herz ............ G06Q 30/02 707/748 |
| 6,470,353 | B1 | 10/2002 | Yaung et al. |
| 6,480,885 | B1 | 11/2002 | Olivier |
| 6,554,618 | B1 | 4/2003 | Lockwood |
| 6,560,578 | B2 | 5/2003 | Eldering |
| 6,658,415 | B1 | 12/2003 | Brown et al. |
| 6,684,212 | B1 | 1/2004 | Day et al. |
| 6,691,106 | B1 | 2/2004 | Sathyanarayan |
| 6,691,153 | B1 | 2/2004 | Hanson et al. |
| 6,704,320 | B1 | 3/2004 | Narvaez et al. |
| 6,718,369 | B1 | 4/2004 | Dutta |
| 6,725,203 | B1 | 4/2004 | Seet et al. |
| 6,741,980 | B1 | 5/2004 | Langseth et al. |
| 6,757,691 | B1 | 6/2004 | Welsh et al. |
| 6,766,362 | B1 | 7/2004 | Miyasaka et al. |
| 6,807,558 | B1 | 10/2004 | Hassett et al. |
| 6,825,945 | B1 | 11/2004 | Silverbrook et al. |
| 6,826,534 | B1 | 11/2004 | Gupta et al. |
| 6,842,773 | B1 | 1/2005 | Ralston et al. |
| 6,845,273 | B1 | 1/2005 | Taylor |
| 6,892,226 | B1 | 5/2005 | Tso et al. |
| 6,920,617 | B2 | 7/2005 | Nitta |
| 6,954,783 | B1 | 10/2005 | Bodwell et al. |
| 6,973,462 | B2 | 12/2005 | Dattero et al. |
| 6,988,839 | B1 | 1/2006 | Yu |
| 7,031,651 | B2 | 4/2006 | McCormick et al. |
| 7,032,022 | B1 | 4/2006 | Shanumgam et al. |
| 7,035,926 | B1 | 4/2006 | Cohen et al. |
| 7,120,590 | B1 | 10/2006 | Eisen et al. |
| 7,127,741 | B2 | 10/2006 | Bandini et al. |
| 7,162,522 | B2 | 1/2007 | Adar et al. |
| 7,328,216 | B2 | 2/2008 | Hofmann et al. |
| 7,464,147 | B1 | 12/2008 | Fakhouri et al. |
| 7,577,665 | B2 | 8/2009 | Ramer et al. |
| 7,640,336 | B1 | 12/2009 | Lu et al. |
| 7,765,481 | B2 | 7/2010 | Dixon et al. |
| 7,881,315 | B2 | 2/2011 | Haveson et al. |
| 9,620,028 | B2* | 4/2017 | Dozier ............ G09B 7/08 |
| 9,928,753 | B2 | 3/2018 | Dozier et al. |
| 10,115,208 | B2* | 10/2018 | Ouyang ............ G06K 9/00362 |
| 2001/0037407 | A1 | 11/2001 | Dragulev et al. |
| 2002/0013836 | A1 | 1/2002 | Friedman et al. |
| 2002/0038246 | A1 | 3/2002 | Nagaishi |
| 2002/0040374 | A1 | 4/2002 | Kent |
| 2002/0049806 | A1 | 4/2002 | Gatz et al. |
| 2002/0064767 | A1 | 5/2002 | McCormick et al. |
| 2002/0100808 | A1 | 8/2002 | Norwood et al. |
| 2002/0119434 | A1 | 8/2002 | Beams et al. |
| 2002/0123334 | A1 | 9/2002 | Borger et al. |
| 2002/0140732 | A1 | 10/2002 | Tveskov |
| 2002/0143754 | A1* | 10/2002 | Paulley ............ G06F 16/24534 |
| 2002/0161770 | A1 | 10/2002 | Shapiro et al. |
| 2002/0169782 | A1 | 11/2002 | Lehmann et al. |
| 2002/0169954 | A1 | 11/2002 | Bandini et al. |
| 2002/0174230 | A1 | 11/2002 | Gudorf et al. |
| 2002/0184092 | A1 | 12/2002 | Cherry et al. |
| 2003/0029911 | A1 | 2/2003 | Kitayama |
| 2003/0050986 | A1 | 3/2003 | Matthews et al. |
| 2003/0093518 | A1 | 5/2003 | Hiraga |
| 2003/0110215 | A1 | 6/2003 | Joao |
| 2003/0164849 | A1 | 9/2003 | Barrie et al. |
| 2003/0207245 | A1 | 11/2003 | Parker |
| 2003/0227479 | A1 | 12/2003 | Mizrahi et al. |
| 2004/0001087 | A1 | 1/2004 | Warmus et al. |
| 2004/0014017 | A1 | 1/2004 | Lo |
| 2004/0030781 | A1 | 2/2004 | Etesse et al. |
| 2004/0039814 | A1 | 2/2004 | Crabtree et al. |
| 2004/0049554 | A1 | 3/2004 | Watanabe |
| 2004/0064515 | A1 | 4/2004 | Hockey |
| 2004/0103118 | A1 | 5/2004 | Irving et al. |
| 2004/0103122 | A1 | 5/2004 | Irving et al. |
| 2004/0103137 | A1 | 5/2004 | Irving et al. |
| 2004/0111423 | A1 | 6/2004 | Irving et al. |
| 2004/0122692 | A1 | 6/2004 | Irving et al. |
| 2004/0128624 | A1 | 7/2004 | Arellano et al. |
| 2004/0145770 | A1 | 7/2004 | Nakano et al. |
| 2004/0165536 | A1 | 8/2004 | Xu et al. |
| 2004/0167794 | A1 | 8/2004 | Shostack et al. |
| 2004/0172637 | A1* | 9/2004 | Koutyrine ............ G06F 8/52 719/328 |
| 2004/0186738 | A1 | 9/2004 | Reisman |
| 2004/0205578 | A1 | 10/2004 | Wolff et al. |
| 2005/0014121 | A1 | 1/2005 | Eck et al. |
| 2005/0014122 | A1 | 1/2005 | Ruvinsky et al. |
| 2005/0015258 | A1* | 1/2005 | Somani ............ G10H 3/125 704/278 |
| 2005/0033657 | A1 | 2/2005 | Herrington et al. |
| 2005/0071328 | A1 | 3/2005 | Lawrence |
| 2005/0079477 | A1 | 4/2005 | Diesel et al. |
| 2005/0105134 | A1 | 5/2005 | Moneypenny et al. |
| 2005/0165743 | A1 | 7/2005 | Bharat et al. |
| 2005/0166143 | A1 | 7/2005 | Howell |
| 2005/0216336 | A1 | 9/2005 | Roberts et al. |
| 2005/0216556 | A1 | 9/2005 | Manion et al. |

(56) References Cited

U.S. PATENT DOCUMENTS

| | | |
|---|---|---|
| 2005/0227216 A1 | 10/2005 | Gupta |
| 2005/0240580 A1 | 10/2005 | Zamir et al. |
| 2005/0246211 A1* | 11/2005 | Kaiser ................ G06Q 30/0201 705/7.29 |
| 2005/0251494 A1 | 11/2005 | Maria Jansen |
| 2005/0266388 A1 | 12/2005 | Gross et al. |
| 2005/0273271 A1* | 12/2005 | Rao ..................... G06K 9/0014 702/19 |
| 2005/0288943 A1 | 12/2005 | Wei et al. |
| 2006/0020662 A1* | 1/2006 | Robinson ................ H04L 51/32 709/203 |
| 2006/0031087 A1 | 2/2006 | Fox et al. |
| 2006/0052057 A1 | 3/2006 | Persson et al. |
| 2006/0062157 A1 | 3/2006 | Yamamoto |
| 2006/0089948 A1* | 4/2006 | Picker ................... H04H 60/73 |
| 2006/0115800 A1 | 6/2006 | Daley |
| 2006/0134593 A1 | 6/2006 | Kalous et al. |
| 2006/0240856 A1 | 10/2006 | Counts et al. |
| 2006/0242234 A1 | 10/2006 | Counts et al. |
| 2006/0246197 A1 | 11/2006 | Kshirsagar et al. |
| 2006/0248197 A1 | 11/2006 | Evans et al. |
| 2006/0252547 A1 | 11/2006 | Mizrahi et al. |
| 2006/0253533 A1 | 11/2006 | Bursztein et al. |
| 2006/0253572 A1 | 11/2006 | Gomez et al. |
| 2007/0027973 A1 | 2/2007 | Stein et al. |
| 2007/0130339 A1 | 6/2007 | Alcorn et al. |
| 2007/0224585 A1 | 9/2007 | Gerteis et al. |
| 2007/0231782 A1 | 10/2007 | Ozawa et al. |
| 2007/0245349 A1 | 10/2007 | Sinn |
| 2007/0260671 A1 | 11/2007 | Harinstein et al. |
| 2008/0005188 A1 | 1/2008 | Li et al. |
| 2008/0082480 A1 | 4/2008 | Gounares et al. |
| 2008/0096519 A1 | 4/2008 | Miegel |
| 2008/0097980 A1* | 4/2008 | Sullivan ................ G06F 16/951 |
| 2008/0126476 A1 | 5/2008 | Nicholas et al. |
| 2008/0176194 A1 | 7/2008 | Zolt et al. |
| 2009/0030876 A1 | 1/2009 | Hamilton |
| 2009/0070490 A1 | 3/2009 | Dozier et al. |
| 2009/0133014 A1* | 5/2009 | Laurila ..................... G06F 8/60 717/174 |
| 2010/0161506 A1* | 6/2010 | Bosenick ................ G06Q 30/02 705/347 |
| 2011/0016137 A1 | 1/2011 | Goroshevslcy et al. |
| 2012/0079409 A1* | 3/2012 | Luo ............................ G06F 8/34 715/772 |
| 2012/0311658 A1* | 12/2012 | Dozier .................. G06F 21/604 726/1 |
| 2012/0315881 A1* | 12/2012 | Woloshyn ......... H04M 1/72433 455/412.2 |
| 2013/0061214 A1* | 3/2013 | Jagatheesan .......... G06F 9/5011 717/151 |
| 2014/0067535 A1* | 3/2014 | Rezaei ............... G06Q 30/0271 705/14.54 |
| 2014/0095619 A1 | 4/2014 | Dozier et al. |
| 2014/0106733 A1* | 4/2014 | Wei ..................... H04L 41/0806 455/418 |
| 2014/0188911 A1* | 7/2014 | Skeen .................. G06F 16/639 707/754 |
| 2014/0356839 A1 | 12/2014 | Dozier et al. |
| 2015/0074634 A1* | 3/2015 | Lee ........................... G06F 8/34 717/104 |
| 2015/0097682 A1* | 4/2015 | Rossi ..................... H05B 45/10 340/628 |
| 2015/0120767 A1* | 4/2015 | Skeen .................. G06F 16/639 707/754 |
| 2015/0286495 A1* | 10/2015 | Lee .......................... G06F 16/38 718/102 |
| 2018/0181378 A1* | 6/2018 | Bakman .................... G06F 8/65 |

FOREIGN PATENT DOCUMENTS

| | | |
|---|---|---|
| JP | 2001306606 A | 11/2001 |
| JP | 2002288187 A | 10/2002 |
| JP | 2005128673 A | 5/2005 |
| JP | 2006065734 A | 3/2006 |
| WO | 2007118231 A2 | 10/2007 |

OTHER PUBLICATIONS

U.S. Appl. No. 11/937,497, entitled "System for Developing Literacy Skills Using Loosely Coupled Tools in a Self-Directed Learning Process within a Collaborative Social Network," filed Nov. 8, 2001.

Zoraini Wati Abas, E-mail activities in the classroom, Computimes Malaysia, Apr. 26, 2001.

* cited by examiner

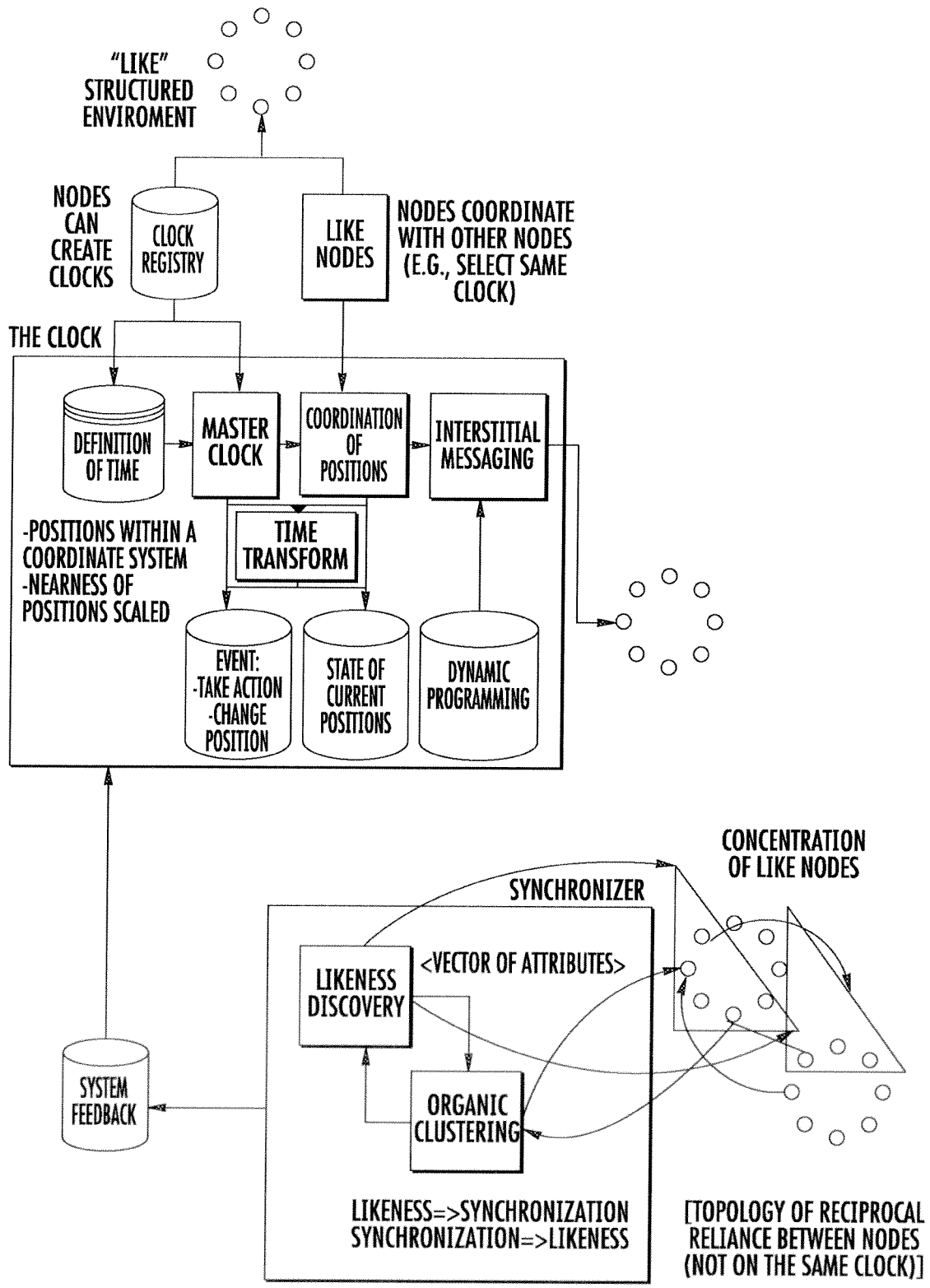

SYSTEM FOR SYNCHRONIZING NODES ON A NETWORK

RELATED APPLICATIONS

This application is a continuation of non-provisional U.S. application Ser. No. 15/360,744, filed on Nov. 23, 2016, which is a continuation of non-provisional U.S. application Ser. No. 14/050,418, filed on Oct. 10, 2013, which is a divisional of non-provisional U.S. application Ser. No. 11/937,495, filed on Nov. 8, 2007, which claims priority to U.S. Provisional Application No. 60/857,570, filed on Nov. 8, 2006, the entire disclosures of which are incorporated by reference as if set forth verbatim herein.

FIELD OF THE INVENTION

This invention generally relates to systems and methods of establishing meaningful connections between nodes on a network and allowing synchronization of those nodes.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 1 is a flowchart of an exemplary system for establishing meaningful connections between nodes on a network and allowing synchronization thereof.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

The present invention is a system and related method for establishing meaningful connections between nodes on a network. The invention allows reliable information to be made available to the nodes, such that computers and networks measure similarity between nodes at a particular point in time.

While the invention has many different applications, one specific embodiment relates to a system and method of creating and operating a social learning network. For the purposes of this example and the present disclosure, copending patent application entitled "System for Developing Literacy Skills Using Loosely Coupled Tools in a Self-Directed Learning Process Within a Collaborative Social Network", filed simultaneously herewith and bearing Ser. No. 11/937,497 is incorporated herein in its entirety. The present system and method may be incorporated, in one embodiment, into the learning process within the collaborative social network described therein.

Generally speaking, a "node" should usually have unique identifying characteristics, be capable of receiving information, and be capable of communicating, displaying, acting, or otherwise using information. Generally, in the present method and system, the node must be "registered" at some point. This usually requires that the node be identified in some manner and then information should be received about the node. At some point, the needs of the node will be determined Those needs could be determined based on characteristics of the node; sequences of events, triggers, or actions related to the node; or by comparison of similarly-situation nodes. The needs, in the present system, can be self-updating and can be defined by a cycle of repeating steps and assessments.

The needs of the node(s) are then mapped into an orientation of one or more events. Of course, the orientation and map can be constantly changing, which would change the ultimate synchronization at times. Once the orientation and synchronization has been determined, then the nodes can be handled in various ways. Among the ways that the nodes can be addressed include delivering satisfaction of the nodes' needs, notifying of other nodes having the same or similar needs or orientation, establishing communication between the node and similarly-situation node(s), or converting similarly-situation node(s). The system may then move on to the next state after the option has been presented and/or addressed to the node, after the passage of a certain amount of time, or after the occurring of an external event.

Therefore, the present system and method is a dynamic system which is constantly and continuously changing. In particular, the needs set and the orientation set are continuously changing. The vector of attributes changes based on behavior and events.

However, the present invention allows the "clocks" to be set for distributed nodes based on these continuously changing vectors. The "clock is set" by the present method by putting all the nodes in the same state; defining similar needs and attribute sets; and providing similarly-situation (or "synchronized") nodes with similar or the same options. The synchronization of the present method actually allows coordination of the nodes by providing a synchronous relationship on top of asynchronous relationships.

In the particular embodiment described herein as an example, the "nodes" of the system are the participants themselves. In the social learning network, definitions of "nearness" that might affect similarity include attributes related to participants such as the participant's position in learning cycle; the titles and/or genres of books being read or the subject matter of the projects being undertaken; the ages, grades, and skill levels of the participants; and the participant's language, location, etc, The informative attributes being tracked by the system can be any attribute or characteristic of a participant in the social learning network, any aspect of the material to be learned, or any other point that can be objectively defined.

Definitions of "time" in relation to the nodes of each network can be different for each participant, but a master clock relates these to Universal Time and establishes metrics to determine which clocks of each node are similar. This invention also creates a matrix of pairwise "distances" between each set of nodes under consideration. Creation of such a matrix enables concepts of either metric or nonmetric multidimensional scaling to be used to visualize the data and select clusters, to which the system can send or receive multimedia content, messages, or information about resources on the web.

Referring to FIG. 1, an exemplary system is shown that manages connections between nodes in a learning community connected by a wide area network. The system identifies clusters among the nodes that share similar attributes, sends or receives content or links to content to those nodes, and passes information to the nodes to let them know they are part of a particular cluster.

A set of nodes in the network can be thought of as a tensor field, composed of vectors that each embodies coordinates of similarly measured attributes such as space and time, arbitrarily defined. Distance between two vectors can be expressed by the metric tensor, a tensor of rank 2 (i.e. a matrix). Consider a general vector $x=[x_1 \ x_2 \ \ldots \ ]$. The distance between two vectors in matrix form is $$(\Delta s)^2 = \begin{bmatrix} g_{11} & g_{12} \\ g_{21} & g_{22} \end{bmatrix} \times [[\Delta x_1 \Delta x_2] \circ [\Delta x_1 \Delta x_2]]$$

where ??? denotes cross product and ??? outer product. The system is configurable with regards to the definition of the x's and the value of the g's.

Time in the synchronization is defined fundamentally by the cycles of the participants in the social learning network. As in all definitions of time, the social learning network goes through cycles, which are progressions during which participants go through sequences of independent and interdependent actions at superimposed scales. The definition of time and the position on the clock is based on an n-element time vector, whose distances from other clocks' positions can be calculated.

The system thus includes a master clock that can transform the time definition for a participant in the social learning network into Universal Time, and the synchronizer coordinates positions of participants who are operating in the context of their own clocks. When an event occurs, i.e. a state change or transition, the positions and their distances are reevaluated. Positions and/or events may change based on interaction with, or attributes of, nodes unrelated to the same clock. Therefore, the system keeps track of which participants or sub-networks are nearest one another and are, therefore, candidates for likeness discovery and clustering. The coordinated nodes each have a vector of dynamic attributes that are not necessarily predefined, but which can be dynamically defined based on a particular set of coordinates for a social learning network, i.e., choosing the set of x's and the value of the g's in the equation above. Previously unsynchronized attributes may change based on interactions between nodes.

Computational efficiency in analyzing such complicated relationships requires reducing the dimensionality of the problem, i.e., representing the data in a smaller number of dimensions. Several techniques may be used, and experience with the system enables the analyses to be refined. One technique is multidimensional scaling which, in its simplest form, starts with a matrix of pairwise distances between the nodes and not the nodes' coordinates. These pairwise distances are possibly scaled or possibly asymmetric. The relative magnitudes of the eigenvalues of this distance matrix indicate which columns of the matrix contributes most to the estimation of the position of the nodes based only on the pairwise distances. When several of these eigenvalues are much larger than the rest, then the corresponding columns provide a lower-dimensional representation that adequately describes the data. The concept is extended to varying weights and missing data, and includes nonlinearities and categorical variables. Once coordinates in the particular spacetime of the network are established, multidimensional Voronoi diagrams and their duals, Delaunay triangulation, are used to keep track of the magnitude of readjustment needed when a node changes state.

Once clusters of similarity are identified, the system targets information to those nodes. Information includes a notification that each node is part of a particular cluster, along with content, and links to additional content that is related to the focus of the cluster. The system may also receive information from each node that changes the node's state, Universal Time, or clustering of the nodes.

In the particular embodiment where the reading of books by mentors and students is the type of learning activity involved in the present system, the following "clocks" exist and are synchronized according to the present method. The simultaneity between all of the clocks helps provide a rich and unique experience for each student who is communicating, generally in writing with a mentor or "pen pal" about the subject matter of the jointly-read book. For example, the Genre Clock is timed to the various stages of the cycle and the specific genre; the Pen Pal Pairs Clock is timed according to the actual timing of pen pal deliveries in the cycle; the Individual Pen Pal Clock reflects the particular interests and activities of a specific pen pal; and the Community Clock provides an ongoing assortment of community related activities that may or may not be related to the genre or the pen pal's stage in a cycle.

The Genre Clock

All participants may follow the same genre sequence so there will be a set of genre-related information and activities that each participant is offered when they reach a particular point in the cycle. For example, a week after a pen pal receives a book to read, the system operator portion of the method will remind the pen pal to check out "About the Book" for additional information about the book. As another example, when a pen pal is waiting for their pen pal's letter, the pen pal may be asked to participate in a subject-related field trip.

The Pen Pal Pair Clock

Each pen pal pair will have its own schedule and individual cycles will flow according to the book selection dates, the reading of the book, and the transfer and receipt of letters between the pen pal ("mentor") and student. Each pen pal pair cycle may take a different amount of time. Every sign-on by every pen pal will be unique because the website will always reflect where a pen pal is in a cycle as well as what activities and resources relate to their specific interests.

The Individual Pen Pal Clock

Although it is similar to the pen pal pair clock, the individual pen pal clock will also contain items and activities that reflect the individual pen pal's experiences and interests. For example, if the pen pal regularly completes crossword puzzles, the pen pal may be invited to participate in a cross-community crossword challenge.

The Community Clock

This is the part of the system that is constantly changing and encouraging participants to interact with the community. It includes polls, contests, live feeds, etc.

While one or more preferred embodiments of the invention have been described above, it should be understood that any and all equivalent realizations of the present invention are included within the scope and spirit thereof. The embodiments depicted are presented by way of example only and are not intended as limitations upon the present invention, Thus, it should be understood by those of ordinary skill in this art that the present invention is not limited to these embodiments since modifications can be made. Therefore, it is contemplated that any and all such embodiments are included in the present invention as may fall within the scope and spirit thereof.

The invention claimed is:

1. A method for determining node similarity by calculating, within a connected computer network, a comparative distance for each pair of a plurality of nodes on the connected computer network, wherein each node comprises a plurality of attributes and each attribute includes a value, comprising the steps of:
   a. having a computer identify a plurality of attributes corresponding to nodes on the connected computer network;
   b. having a computer perform a comparison of a first attribute corresponding to a first node on the connected computer network to a first attribute corresponding to a second node on the connected computer network to determine a relative distance between the first attribute of the first node on the connected computer network and the first attribute of the second node on the connected computer network, wherein the comparison comprises
      i. creating a column matrix of pairwise distances between the first attribute of the first node and the first attribute of the second node on the connected computer network;
      ii. comparing the relative magnitudes of the eigenvalues of the columns of the matrix and determining the estimated positions of the first node and the second node based on which columns of the matrix contribute most to the estimation of the positions of the first node and the second node;
   c. having the computer assess the similarity between the first and second nodes on the connected computer network by calculating the comparative distance based on a plurality of the estimated positions determined at step (b); and
   d. having the computer identify one or more additional nodes on the connected computer network based on the assessed similarity between the first node on the connected computer network and the second node on the connected computer network.

2. The method of determining node similarity of claim 1 further comprising the step of scaling the pairwise distances between the first attribute of the first node and the first attribute of the second node.

3. The method of determining node similarity of claim 1 wherein the value of each attribute is dynamic and capable of constantly and continuously changing.

4. The method of determining node similarity of claim 1 wherein the first node on the connected computer network and the second node on the connected computer network are part of a subset of the plurality of nodes on the connected computer network, wherein the subset is identified based on at least one of the plurality of attributes.

5. The method of determining node similarity of claim 1 wherein the nodes are capable of displaying information.

6. The method of determining node similarity of claim 1 wherein the method further comprises the step of self-updating the assessing of the similarity between the first and second nodes on the connected computer network.

* * * * *